(12) United States Patent
Wolford et al.

(10) Patent No.: US 7,739,901 B2
(45) Date of Patent: *Jun. 22, 2010

(54) SYSTEM AND METHOD FOR DETECTING AND QUANTIFYING CHANGES IN THE MASS CONTENT OF LIQUID STORAGE CONTAINERS

(75) Inventors: Jimmy Wolford, Gladewater, TX (US); Bernie Wolford, Spring, TX (US); Clark Lockerd, Houston, TX (US); Ricky Slaughter, Longview, TX (US)

(73) Assignee: Mass Technology Corporation, Kilgore, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/286,304

(22) Filed: Nov. 22, 2005

(65) Prior Publication Data
US 2007/0186623 A1    Aug. 16, 2007

Related U.S. Application Data

(63) Continuation-in-part of application No. PCT/US2005/016930, filed on May 13, 2005, which is a continuation-in-part of application No. PCT/US2004/021704, filed on Jul. 7, 2004.

(51) Int. Cl.
*G01M 3/32* (2006.01)
(52) U.S. Cl. ........................................ 73/49.2
(58) Field of Classification Search .................. 73/40, 73/49.2, 49.3, 299, 301
See application file for complete search history.

(56) References Cited

U.S. PATENT DOCUMENTS

| 4,630,478 A | * | 12/1986 | Johnson | ................. 73/299 |
|---|---|---|---|---|
| 4,646,560 A | | 3/1987 | Maresca, Jr. et al. | |
| 4,862,733 A | | 9/1989 | Hyfantis, Jr. et al. | |
| 5,127,266 A | | 7/1992 | Maresca et al. | |
| 5,146,783 A | | 9/1992 | Jansche et al. | |
| 5,146,784 A | | 9/1992 | Maresca, Jr. et al. | |
| 5,201,212 A | | 4/1993 | Williams | |
| 5,267,467 A | | 12/1993 | Caron | |
| 5,375,455 A | | 12/1994 | Maresca, Jr. et al. | |
| 5,950,487 A | | 9/1999 | Maresca, Jr. et al. | |
| 6,308,556 B1 | | 10/2001 | Sagi et al. | |
| 6,374,825 B1 | | 4/2002 | Wallin et al. | |
| 6,499,353 B1 | | 12/2002 | Douglas et al. | |
| 6,510,736 B1 | * | 1/2003 | Van Ee | ................. 73/299 |
| 6,549,857 B2 | | 4/2003 | Fierro et al. | |
| 6,854,320 B2 | | 2/2005 | Wolford et al. | |
| 6,944,570 B2 | | 9/2005 | Neeser et al. | |

FOREIGN PATENT DOCUMENTS

| EP | 1651939 A | 5/2006 |
|---|---|---|
| WO | 2005/008206 A2 | 1/2005 |
| WO | 2006/016931 A1 | 2/2006 |
| WO | 2005/008206 A3 | 1/2007 |

* cited by examiner

*Primary Examiner*—Daniel S Larkin
(74) *Attorney, Agent, or Firm*—Patton Boggs LLP (57) ABSTRACT

A storage tank leak detection system, including a quartz crystal type pressure transducer held at a constant temperature, a bubbler-based pressure sensor for reporting tank bottom pressure measurements to the transducer, a fluid surface measurement apparatus to report liquid surface pressure to the transducer, atmospheric pressure measuring apparatus, and a computing system for, based on data reported by all components, effecting data correction (corrected for atmospheric and container physical variations during data gathering) and regression techniques to yield data indicative of changes, if any, in mass content of a liquid storage container, such as a surface storage tank for petroleum and other chemicals.

14 Claims, 2 Drawing Sheets

Figure 1

Figure 2

SYSTEM AND METHOD FOR DETECTING AND QUANTIFYING CHANGES IN THE MASS CONTENT OF LIQUID STORAGE CONTAINERS

CROSS REFERENCE TO RELATED APPLICATIONS

This is a continuation-in-part application with respect to Patent Cooperation Treaty International Application PCT/US2005/016930 filed on May 13, 2005, which is a continuation-in-part of Patent Cooperation Treaty International Application PCT/US2004/021704 filed on Jul. 7, 2004, both of which designated the U.S. and are incorporated by reference in their entireties.

BACKGROUND OF THE INVENTION

1. Field of the Invention

The present invention is directed towards a method and apparatus for providing a safe, precise, and cost-effective storage tank leak detection system and more particularly, to a method and apparatus wherein the containment integrity of a storage tank is determined by mass measurements of the stored product.

2. Background Information

Storage tanks play a vital role in today's economy. The economy, on a global scale, depends on the proper function of these tanks as they are prevalent in several industries and virtually every geographical region in the world. In light of the vital role these storage tanks play, the integrity of the tanks is placed at a premium. That is, storage tank owners are willing to invest huge sums of money in both the maintenance and inspection of such tanks.

These tanks come in all shapes and sizes, are found both below and above ground, and are used to store a wide range of materials. Storage tank capacities range from hundreds to millions of gallons and are used to store a staggering assortment of products; these storage tanks are commonly used to store hazardous material.

As one could imagine, there are a wide range of problems associated with maintaining storage tank integrity, particularly with above ground storage tanks. Given the enormous dimensions of above ground tanks, the corrosive products contained within the tanks, the incredible mass of the stored product, and the extreme weather conditions the tanks are subjected to, it is plain to see that above ground storage tank leaks are an all-to-common problem. Using the United States Environmental Protection Agency leak detection threshold criteria of 0.05 gallons per hour in a 10,000-gallon underground tank, that threshold would equate to a 15 gallon per hour detection level in an 80,000 barrel above ground tank. Given the limited number of systems capable of meeting the EPA's underground storage tank leak detection threshold and the added difficulties associated with above ground tanks, the difficulty in protecting against and detecting leaks is easily seen.

However, the recognized difficulty in preventing storage tank leaks does not mitigate the duties or liabilities imposed on responsible parties. Tremendous environmental and economic consequences and the threat of litigation and clean up costs associated with storage tank leaks force responsible parties to invest large sums of money in the maintenance and inspection of the tanks. Tank inspections are costly with respect to the amount of money spent, the danger presented to the inspectors and the environment, and production downtime. In fact, these inspections often remove a tank from service for more than one month. The threat of liability also forces responsible parties to spend money unnecessarily for the maintenance of these tanks. Moreover, liability does not end with litigation and clean-up costs.

Currently, responsible parties are, in some countries, being incarcerated as a direct result of storage tank leaks. These leaks have contaminated surrounding ground water, some of which serves as drinking water for local residents. As such, the facilities associated with such incidents have been shut down until compliance with emissions regulations can be established beyond reasonable doubt. Such proof, in turn, is dependent on proof of reliable and sufficiently accurate detection systems and methods for proving such compliance. Each day the shuttered facilities remain inoperative adds to an already tremendous amount of money lost.

Prior to the present invention (to be described in detail hereafter), there are simply no known systems or methods by which the leak detection requirements can be met. Presently available leak detection systems lack detection thresholds low enough to detect leaks down to permissible upper leakage limits for above ground storage tanks Clearly, for the reasons set forth above, there is a dire and immediate need for the ability to determine, with far more precision than presently possible through use of presently available systems and methods, the presence and degree of leakage from above ground storage tanks, at least to the extent of proving compliance with applicable storage tank leakage regulations or statutes.

RELATED CONVENTIONAL TECHNOLOGIES AND DISTINCTIONS FROM PRESENT INVENTION

Storage tank leak detection systems are known in the art; however, these products are fraught with problems. The present systems are imprecise, or provide erroneous data for any or all of reasons including: the consistency of the soil acting as the tank's foundation, the temperature stratification of the in-tank product, extraneous noise sources, thermal expansion of the tank's contents, water table level, previous soil contamination, and/or tank shell dynamics.

Further, some detection devices can only be used when the storage tank is empty, and no known system or method ensures a comprehensive inspection of the tank. The most common form of such a system is "vacuum box testing"; however, this system is intended only for weld joints and is not usually applied to the entire tank bottom. Magnetic flux floor scanning is also used, but is not effective at examining the area of the floor surface close to the surface walls or where there are physical obstructions. Ultrasonic detection is used, but this is only effective for small areas of the surface. Gas detection is also used, but the types of materials stored in the tank can obstruct this method.

Other common leak detection systems employ a level sensor. However, even large volume changes produce only small level changes, as the cross-sectional area of the liquid surface in these tanks is very large. This, combined with differential expansion and temperature change of the stored liquid and its vapor, make this type of detection system inconsistent and very nearly worthless.

Finally, mass measurement detection systems are known in the art. However, the presently available systems and associated methods are not capable of the precision, which is indicated above as crucial at the present time (and which, as described below, is afforded by the systems and methods of the present invention). Present mass measurement leak detection systems in the art are limited by tank shell variations resulting from temperature effects on tank shell plating. As such, known mass measurement detection systems are only sensitive enough to be used in smaller tanks, typically underground storage tanks. However, as will be seen in the specification to follow, the present invention overcomes tank shell variations and other shortcomings of presently known technology in this field through data collection and data correction apparatus, techniques and interpretation.

In light of the severe consequences of failing to detect significant storage tank leaks, presently not detectable through use of known systems or methods, there is a compelling need for a system and method by which one can detect very small leaks even in very large tanks, ideally in a safe and cost effective manner.

It would well serve those who are responsible for maintaining storage tank integrity to provide a safe, precise, and cost-effective detection system that does not depend on independent variables such as fluid temperature, fluid stratification, or tank stabilization, and may be used in an efficient manner thereby preserving industrial and environmental resources.

The system by its very nature is also a very effective means of accurately measuring the amount of fluid (product) added to or removed from a tank. Accordingly the system represents an attractive alternative to hand strapping and other volume based (through flow meter) product custody transfer measurement methods and apparatus. Where the accuracy of custody transfer measurements is of significance due to the quantities, commercial terms and value of the product this system can be directly employed to accurately measure the transfer amounts.

SUMMARY OF INVENTION

In view of the foregoing, it is an object of the present invention to provide a storage tank leak detection apparatus with a very low detection threshold that may be used in an efficient manner thereby preserving industrial and environmental resources.

It is another object of the present invention to provide an apparatus for safe storage tank leak detection.

It is another object of the present invention to provide an apparatus for precise storage tank leak detection.

It is another object of the present invention to provide an apparatus for cost-effective storage tank leak detection.

It is another object of the present invention to provide an apparatus for non-intrusive storage tank leak detection.

It is another object of the present invention to provide an apparatus for storage tank leak detection where the contents of the storage tank do not have to be removed.

It is another object of the present invention to provide an apparatus for storage tank leak detection where no chemical additives are involved.

It is another object of the present invention to provide an apparatus for immediate storage tank leak detection.

It is another object of the present invention to provide an apparatus for conclusive storage tank leak detection.

It is another object of the present invention to provide an apparatus for quantitative storage tank leak detection.

It is another object of the present invention to provide an apparatus to determine whether head changes are directly attributable to leaks or other effects.

It is another object of the present invention to provide an apparatus for storage tank leak detection that does not depend on fluid temperature changes.

It is another object of the present invention to provide an apparatus for storage tank leak detection that does not depend on fluid stratification.

It is another object of the present invention to provide an apparatus for storage tank leak detection that does not require tank stabilization time.

It is another object of the present invention to provide an apparatus for storage tank leak detection that requires only minimal tank preparation.

It is another object of the present invention to provide an apparatus for storage tank leak detection that has been evaluated by an EPA-recognized, independent third party laboratory.

It is another object of the present invention to provide an apparatus for safe measurement of product custody transfers.

It is another object of the present invention to provide an apparatus for cost-effective measurement of product custody transfers.

It is another object of the present invention to provide an apparatus for precise mass based measurements of product custody transfers.

It is another object of the present invention to provide an apparatus for measurement of product custody transfer that does not depend on fluid stratification.

It is another object of the present invention to provide an apparatus for highly accurate measurement of product custody transfer where flow meters are not available.

It is another object of the present invention to provide a method with a very low detection threshold that may be used in an efficient manner thereby preserving industrial and environmental resources.

It is another object of the present invention to provide a method for safe storage tank leak detection.

It is another object of the present invention to provide a method for precise storage tank leak detection.

It is another object of the present invention to provide a method for cost-effective storage tank leak detection.

It is another object of the present invention to provide a method for non-intrusive storage tank leak detection.

It is another object of the present invention to provide an apparatus for storage tank leak detection where the contents of the storage tank do not have to be removed.

It is another object of the present invention to provide a method for storage tank leak detection where no chemical additives are involved.

It is another object of the present invention to provide a method for immediate storage tank leak detection.

It is another object of the present invention to provide a method for conclusive storage tank leak detection.

It is another object of the present invention to provide a method for quantitative storage tank leak detection.

It is another object of the present invention to provide a method to determine whether head changes are directly attributable to leaks or other effects.

It is another object of the present invention to provide a method for storage tank leak detection that does not depend on fluid temperature changes.

It is another object of the present invention to provide a method for storage tank leak detection that does not depend on fluid stratification.

It is another object of the present invention to provide a method for storage tank leak detection that does not require tank stabilization time.

It is another object of the present invention to provide a method for storage tank leak detection that requires only minimal tank preparation.

It is another object of the present invention to provide a method for safe measurement of product custody transfers.

It is another object of the present invention to provide a method for cost-effective measurement of product custody transfers.

It is another object of the present invention to provide a method for precise mass based measurements of product custody transfers.

It is another object of the present invention to provide a method for measurement of product custody transfer that does not depend on fluid stratification.

It is another object of the present invention to provide a method for highly accurate measurement of product custody transfer where flow meters are not available.

Embodiments and practice of the present invention provides a safe, extremely precise, and cost-effective solution to the problems mentioned above. Test results produced through practice of the present invention provide a determination of containment integrity, transfer quantities and in the event of leakage, a precise volumetric leak rate, all at accuracy levels unprecedented in the art. Use of the present invention is not restricted by fluid type, fluid temperature, fluid level, or tank size.

The present invention obviates the need for physical inspection of storage tanks. As such, there is no need to drain, clean, or enter a to-be-inspected/monitored tank, therefore, neither inspectors nor the environment are exposed to the contents of the tank as a result of the evaluation. In addition to eliminating hazardous by products associated with the draining/cleaning process, also avoided is the danger of transporting and storing the drained product.

System control techniques and data correction software provide for precision not possible with systems now known in the art. Finally, the systems and methods of the present invention do not require chemical additives to be mixed with the tank contents. As such, incidental spills and leaks of such agents are avoided altogether.

Practice of the present invention, in lieu of alternative, conventional technologies, is extraordinarily cost effective. Neither a tank structure, its foundation, nor the surrounding soil are disturbed as part of monitoring or inspection of tanks pursuant to the present invention. As such, set-up time and capital investment costs are minimized.

Because practice of the present invention eliminates manual inspection of a tank, it is non-intrusive. Therefore, operation of the tank is not hindered, and production downtime is altogether avoided.

Costs related to the handling, transport, disposal, or storage of removed hazardous material (required by, among other methods, any method requiring internal, physical inspection of a tank) are likewise avoided.

The unprecedented utility afforded by the present invention, arising from the unprecedented accuracy of the system of the present invention, is the product of substantially improved sensitivity (compared to prior technologies) with which the present system is able to measure mass variations.

The present invention, by employing a combination of techniques and components not known in the art, provides a leak detection threshold that is much lower than any known device. This is important because, the lower the leak detection threshold level of such a system, the more effective it will be at detecting leaks.

One feature of the present system involves its maintaining the mass measurement component's temperature at a substantially constant level during an entire measurement process. Further, certain features of the system correct errors in the collected data which are attributable to storage tank shell dynamics, as well as to the inherent imprecision in the mass measurement devices. This data correction process will be discussed in detail in the specification to follow.

The systems and methods of the present invention overcome tank shell variations (a major "weak link" in mass measurement-based systems) through data collection and data correction techniques. First, data is collected through use of a quartz crystal type pressure transducer (the specifications and use of this transducer will be explained in more detail in the Detailed Description of the Preferred Embodiment). A Programmable Logic Controller (PLC) connected to the pressure transducer, records pressure data over a period of time (preferably one to five nights). The atmospheric temperature and barometric pressure are recorded and precisely analyzed to calculate any changes in the mass of the fluid within the tank. The atmospheric temperature is recorded and precisely analyzed to correct for indicated changes in the observed mass which arise only from tank shell temperature variations. The corrected data is regressed to give a line slope that is converted to a leak rate of volume over time (the system usually being configured for reporting in gallons per hour).

Data generated by the transducer is, according to the preferred mode of the present invention, collected on a 24-hour basis. Only data containing a sufficiently low amount of extraneous noise is analyzed. Such data is, accordingly, usually obtained at nighttime and during fair weather conditions. Such selective data gathering eliminates, among other adverse factors, the effect of the sun's radiant energy on the surface area of the tank, which may adversely affect the mass measurement of the stored product. Also, data correction software accounts for the coefficient of thermal expansion for any given storage tank construction material. The nighttime data is corrected for atmospheric conditions and variations in the tank shell. These measurements and corrections allow the system to repeatedly achieve the stated accuracy in real world conditions on a routine basis.

For even greater precision, the leak detection system of the present invention provides for an independent barometric measuring means to constantly record the barometric pressure during the data collection process. This independent barometric pressure measuring means, used in combination with data correction software, corrects any zero drift associated with the individual pressure transducer. That is, this system corrects for the inherent error present in any transducer when that transducer deviates from its initial reference pressure.

Extremely precise measurement of the pressure differential between combined atmospheric and vapor pressure at the surface of a tank's contents versus and the pressure substantially at the bottom of the tank lies at the heart of the evaluation methodology of the present invention. The tank bottom pressure is determined through use of a "bubbler" which is ideally positioned at or near the bottom of a tank and to which is provided a regulated inert gas.

The pressure, measured at the tank floor ("tank bottom pressure") and atmospheric and vapor pressure measured just above the liquid surface, is recorded by a highly accurate differential pressure transducer on a real time basis and post processed using a data analysis routine to accurately calculate any changes in the mass of fluid contained within the tank to determine if there is a loss.

The present system, using the specified transducer, and when used in the manner and with the data interpretation described herein, is capable of detecting above ground storage tank leaks at a threshold of less than 0.9 gallons per hour with a probability of detection of 95% in a 120 foot diameter tank—far more accurate than is possible with any presently available quantitative leak detection system. This, quantitatively, amounts to detecting pressure differentials equivalent to less than 1/10,000th inch of water column pressure, a tolerance level necessary to achieve such detection thresholds.

The method and apparatus of the present invention provides a safe and effective way to detect very small leaks in very large tanks. Particularly, the present invention provides a tremendous improvement in accuracy and leak detection threshold, allowing its operators to achieve greater results than presently thought possible. This, in turn, presents a solution of problems of staggering magnitude for many storage tank owners and operators, as well as those nearby who are adversely affected by excessively leaking storage tanks (nearby land owners, those dependent on possibly contaminated ground water supplies, and all those, human and animal, who are otherwise adversely affected by the environmental damage attending most storage tank leakage).

BRIEF DESCRIPTION OF THE DRAWINGS

Annex A is a printout of the industrial controller program source code referred to herein as the PLC program.

DETAILED DESCRIPTION OF THE PREFERRED EMBODIMENT

Figure 1:
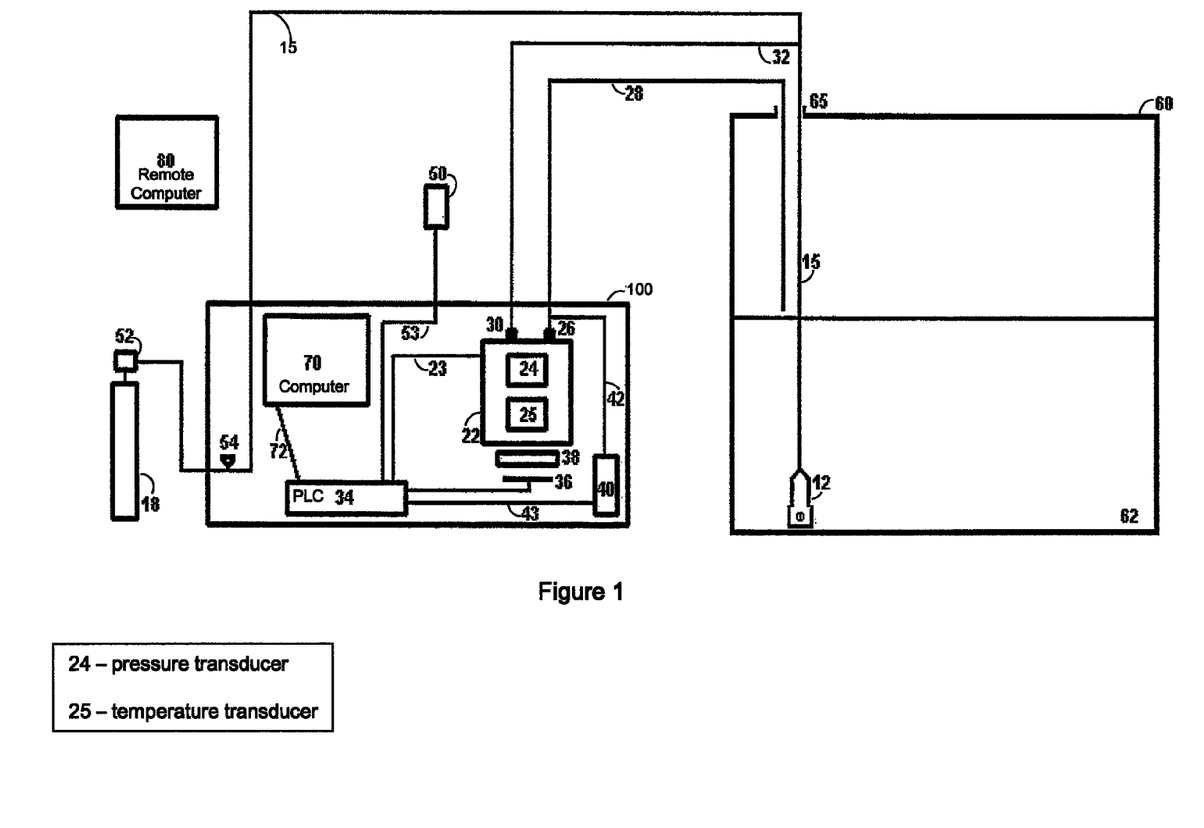
FIG. 1 is a block diagram depicting the general layout of the present leak detection system.
Figure 2:
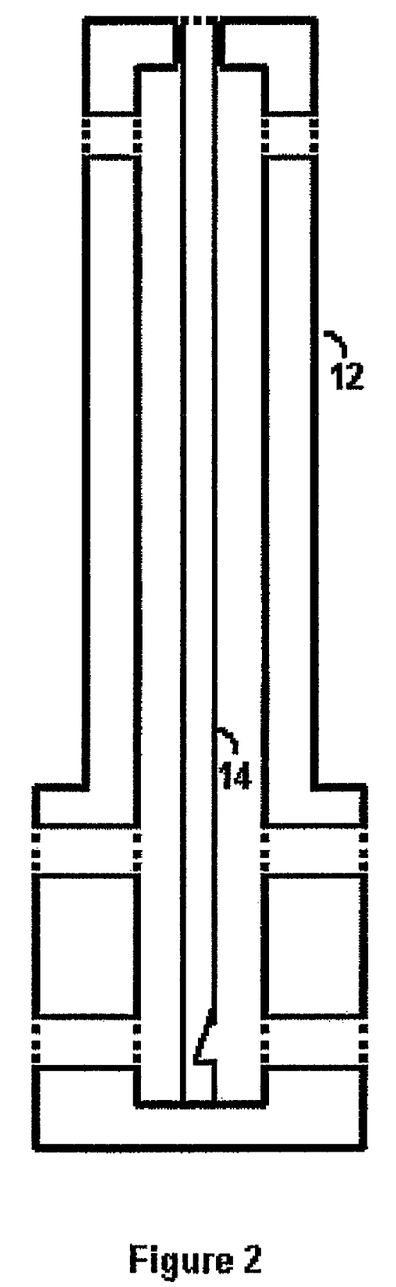
FIG. 2 is an elevational, sagital cross sectional view of the bubbler of the leak detection system.

In the drawings and the description that follows, FIGS. 1 and 2 generally depict a preferred configuration and constituency of a storage tank leak detection system according to the present invention, which system is generally designated by the reference number 10.

The preferred embodiment of the present invention includes an inert gas pressure reduction 52 and flow rate regulator 54 which provide a clean and steady supply of an inert gas, such as nitrogen, from a compressed cylinder 18 to an in-tank bubbler 12 via bubbler tube 15.

The in-tank bubbler 12, which is placed substantially at the bottom of a to-be-evaluated storage tank 60, releases inert gas bubbles in a consistent manner with minimal pressure variation. The minimum inert gas pressure required to consistently form and release bubbles at the bottom of the tank's contents serves as a proxy for the hydrostatic pressure at the bottom of the tank.

The formation and release of inert gas bubbles in a consistent manner with minimal pressure variation is accomplished by way of a flow rate regulator 54 and, in the preferred embodiment of a system according to the present invention, a specially shaped orifice at the terminus of metal tubing 14, which is used to convey the inert gas within the in-tank bubbler 12. This orifice is in the form of a notch cut into the side of the metal tubing at an approximately 30-degree angle to the tubing's vertical orientation.

In-tank bubbler 12 is made of a substantially non-corrosive metal, stainless steel, for example, however, any material that is corrosion resistant and of sufficient density is adequate for use with the present invention. In-tank bubbler 12 is directly immersed in storage tank 60 and rests on storage tank bottom surface 62 in the preferred mode of practice of the present invention.

At its proximate end, bubbler tube 15 forms a gas tight seal with in-tank bubbler 12. Extending from in-tank bubbler 12, bubbler tube 15 passes through storage tank top surface access 65 to an area outside of the class 1 region of storage tank 60 (class 1 region refers to the National Electric Code designated hazardous areas). Bubbler tube 15 serves as a conduit for pressurized inert gas flowing to the in-tank bubbler 12.

Placed outside of the aforementioned class 1 region, but no more distant from tank 60 than is necessary to so reside, is a measurement, control and data collection unit 100 (MCDC for short). MCDC 100 includes a differential pressure transmitter 22. In the preferred embodiment, differential pressure transmitter 22 is comprised of a highly precise quartz crystal pressure transducer 24 and a highly precise quartz crystal temperature transducer 25.

Transducer 24 contains an oscillating quartz crystal and has a pressure resolution of $1 \times 10^{-8}$ of full scale.

The ultimate resolution achievable with a transducer is limited by its stability and repeatability. System 10 greatly improves upon the stability and repeatability of the transducer thereby increasing the true resolution of transducer 24. In this regard, in system 10, transmitter 22 is to be insulated and, as will be further described in this section, transducer 24 is to be held at a constant temperature. This, in turn, achieves the desired high stability and repeatability.

Quartz crystal type pressure transducer 24 includes a transducer low side 26, through which is determined a first differential reference—the atmospheric pressure value at the liquid surface (atmospheric pressure and vapor pressure directly above the liquid surface).

Transducer low side tube 28 forms a gas tight seal at its proximate end with transducer low side 26 and extends through the tank access 65 to a location just above the tank 60 liquid contents. Transducer low side tube 28 allows transducer low side 26 to receive the atmospheric pressure from the reference point at the liquid surface.

Quartz crystal type pressure transducer 24 also includes a transducer high side 30 which receives input reflecting the sum of the atmospheric (barometric) and hydrostatic pressure near the tank bottom surface 62.

Transducer high side tube 32 forms a gas tight seal at its proximate end with transducer high side 30 and extends to a gas tight "tee" connection with bubbler hose 15 near tank access 65.

Transducer 24 measures the pressure differential between the transducer low side 26 and transducer high side 30 to arrive at the pressure exerted by the mass of the tank contents while eliminating the pressure variations due to change in atmospheric pressure by way of their inclusion in both the high side and low side pressure measurements. Transmitter 22, communicating digitally, then sends this processed information to PLC 34. This data is transmitted along data transfer means 23. In the preferred embodiment, data transfer means 23 is a standard bus communications cable. However, one could easily envision a data transfer means, such as wireless communication, that would work equally as well.

Quartz crystal temperature transducer 25 serves as a part of a temperature regulation scheme used to keep the pressure transducer 24 at a constant temperature during the data gathering process. Quartz crystal temperature transducer 25 communicates digitally via transmitter 22 with the PLC 34. This data is transmitted along data transfer means 23. In the preferred embodiment, data transfer means 23 is a standard bus communications cable. However, one could easily envision a data transfer means, such as wireless communication, that would work equally as well.

In the preferred embodiment, the PLC, through a control loop, generates an output which activates resistive heater 36 which in combination with heat sink 38 regulates the temperature of pressure transducer 24. While the above temperature regulating scheme has been described with reference to one embodiment, one could easily imagine other temperature regulation schemes that would work equally as well.

The use of this temperature regulation scheme to hold pressure transducer 24 at a constant temperature further substantially increases the precision of the present system 10. The absolute temperature at which pressure transducer 24 is maintained is not critical, rather it is the constancy of temperature which most affects the stability and repeatability of transducer 24 in making its crucial measurements.

As a matter of practicality, the temperature of pressure transducer 24 is, according to the preferred mode of practice of the present invention, maintained at a temperature which is approximately +20° F. of the maximum expected ambient temperature during the course of a given storage tank evaluation.

MCDC 100 further includes barometric pressure measuring means 40. Barometric measuring means 40 serves as an independent reference for true atmospheric pressure. In the preferred embodiment, barometric pressure measuring means 40 may be any standard barometer that sends signals to be processed by PLC 34 (each respectively being configured for communication with the other).

Barometric measuring means 40 is very useful for increasing the precision of system 10. The present invention employs barometric measuring means 40 to serve as an independent measure of true atmospheric pressure above the tank's liquid contents, thereby allowing for data correction over any extended period of time. As will be discussed in this section, data correction using values taken from barometric pressure measuring means 40 greatly increases the precision of the current invention.

Barometric measuring means tube 42 forms a gas tight seal at its proximate end with barometric measuring means 40 and forms a gas tight seal at its distal end where it "tees" into transducer low side tube 28. Barometric measuring means tube 42 allows barometric measuring means 40 to receive the barometric pressure from the reference point at the surface of liquid within storage tank 60. Data transfer means 43 extends from the output of barometric pressure measuring means 40 to PLC 34. In the preferred embodiment, data transfer means 43 is a standard bus communications cable. However, one could easily envision a data transfer means, such as wireless communication, that would work equally as well.

System 10, in its preferred embodiment, also includes an ambient temperature measurement and reporting means 50, or "ambient temperature transmitter 50." Ambient temperature transmitter 50 is advised to be mounted outside of the class I region of storage tank 60, so as to provide an accurate measure of the ambient temperature of the air surrounding tank 60. This, in turn, facilitates data correction, over any extended period of time, for such tank shell expansion and contraction as attends ambient temperature variations. Temperature data is transferred along data transfer means 53 to the PLC 34. Ambient temperature transmitter 50 is, as employed in the manner described herein, another very useful element for increasing the precision of system 10. In the preferred embodiment, data transfer means 53 is a standard bus communications cable. However, one could easily envision a data transfer means, such as wireless communication, that would work equally as well.

Also contained within MCDC 100 is the man-machine interface computer 70. Although not necessary, the PLC 34 and the computer 70 are typically housed in a common enclosure, such as MCDC unit 100. In accordance with the described routines to follow and the exemplary computer code depicted in Annex A attached hereto and incorporated herein by reference, the PLC processes data received from transmitter 22, atmospheric pressure measuring means 40 and ambient temperature measurement means 50. The PLC also controls the temperature of pressure transducer 24 by means of resistive heater 36 and heat sink 38. The PLC 34 communicates with man-machine interface computer 70 by data transfer means 72. In the preferred embodiment, data transfer means 72 is a standard bus communications cable. However, one could easily envision a data transfer means, such as wireless communication, that would work equally as well.

Man-machine interface computer 70 provides the means whereby the operator interacts with the system to: log data, monitor system operation, enter temperature set point, record job specific physical site and client data, collect and process custody transfer data, trouble shoot detected errors and enter password keys to authorize data collection.

Referring, in part, to Annex A, the software of the present system commences operation with the initialization of data collection at the tank bottom, along with the atmospheric and environmental conditions. Data is automatically collected via industrial computer controlled programming over some length of time, preferably 36 to 60 hours. The length of the test is dependent on tank size and site weather conditions.

As will be discussed and illustrated hereafter, remote computer 80 contains software that performs linear regressions of data downloaded from the man-machine interface computer 70. This regression detects minuscule changes in the mass of the stored product, thereby indicating the presence of the smallest of leaks. As the compilation of data grows, the more precise the regression becomes. The post processing module and software of remote computer 80 is independent of the PLC 34 and the man-machine interface computer 70.

There are three software programs or modules involved with the storage tank leak detection system of the present invention: the PLC program, the man-machine interface computer program and the post processing program operated on remote computer 80.

The PLC program is performed by the PLC 34 and is responsible for obtaining (subroutine Measure) data from transmitter 22, controlling the temperature of transmitter 22 (subroutine Temp-Ctrl), obtaining transmitter 22 differential pressure and temperature (subroutine Measure), and backup data storage. The data acquired by the PLC program is stored within the PLC 34 in non-volatile memory.

The PLC program interrogates the differential pressure transmitter (transmitter 22) via a serial connection. The pressure read from differential pressure transmitter 22 is the difference in pressure read from transducer low side 26 and transducer high side 30. That pressure value is modified by two additional variables in order to improve the accuracy of the reading. The post processing program performs measured head corrections for a) tank shell temperature changes based on measurements of ambient temperature and b) atmospheric pressure changes which otherwise would skew the data interpretation. This post processing is intended solely to detect variations of contents of storage tank 60 due to leakage and eliminate variations due to environmental changes. Any change in tank diameter is accommodated in the calculations thus properly attributing substantially all variations in differential pressure to variations in the content of storage tank 60, such as through leakage.

The PLC subroutines Measure and Tx-Cmplt-Int obtain pressure readings and transducer temperature readings from transmitter 22. This may be performed every one minute.

Subroutine Temp-Ctrl controls pressure transducer 24 temperature, which is performed as follows: the operator entered temperature set point is compared to the digitally communicated transducer temperature, the difference or error is then used to establish the resistive heater output.

The remaining recorded variables are also obtained on a one minute time frame. This is accomplished in the Measure subroutine.

Finally, the PLC program is responsible for data storage. This is accomplished in subroutine Record. One record per minute is stored. The organization of the data is by date and time. The record for every minute will include: (1) the differential pressure representing the hydrostatic pressure produced by the fluid mass (as a floating-point number, IEEE 32 bit format), (2) the barometric pressure (as x1000-16 bit integer), (3) the ambient temperature (as x100-16 bit integer and (4) the transducer temperature (as x100-16 bit integer).

The system features a man-machine interface computer 70 to allow direct operator interaction with the unit, to accept the operator's transducer temperature setpoint, to allow the operator to graphically visualize the differential pressure data collection via a time based chart, to allow the operator to determine the state of the machine, to allow the operator to trouble-shoot any system recognized errors, to provide a second (primary) means for logging the collected data, to allow the operator to authorize data collection by way of entry of a predetermined "run key", to allow the operator to record client, location, tank and fluid physical characteristics and to allow the operator to initiate and conclude mass based fluid custody transfer measurements.

The third software program of the storage tank leak detection system of the claimed invention is the post processing program. Remote computer 80 performs this program. Linear regression of logged data is performed as follows.

The data files created by the PLC program are read in, these include time stamped values for measured hydrostatic pressure created by the fluid mass, ambient temperature, fluid temperature, transducer temperature, and atmospheric pressure, along with the tank diameter and the specific gravity of the tank contents.

Three graphical presentations of hydrostatic pressure (fluid mass) versus time are created, one of the raw hydrostatic pressure data, one of the tank shell temperature corrected hydrostatic pressure data and one of the tank shell temperature corrected hydrostatic pressure data with atmospheric pressure corrections.

Tank shell temperature corrections are made on the basis of the coefficient of thermal expansion of the construction material of the tank and the calculated tank shell temperature. The calculated tank shell temperature is derived from a combination of the fluid temperature and the ambient temperature at a ratio entered by the software operator, typically in the range of 0.2 to 1.0.

The selection of the ratio to apply is dependent upon tank physical conditions such as the presence of external insulation, weather conditions including rain, wind and humidity and the tank contents (the appropriateness of the selected ratio is further verified by the method presented below). Atmospheric pressure corrections are made based on the application of a barometric correction coefficient applied to the hydrostatic pressure data (this barometric correction coefficient is determined empirically through the observation of head variations as a function of barometric pressure changes in an otherwise leak free and well insulated test tank during initial system commissioning).

The operator selects data periods, typically consistent nighttime periods where the data is relatively free from the significant effects of solar radiant energy, rain and other significant weather events and the software performs linear regressions of the three hydrostatic pressure data series over these periods.

The resultant slope of the linear regression of tank shell temperature corrected hydrostatic pressure with barometric pressure corrections is converted to a leak rate on the basis of the tank diameter and the specific gravity of the tank contents.

In order to validate the results and identify any hydrostatic pressure changes that are inconsistent with a leak-free tank the software performs a validation of the data by calculating the theoretical tank shell temperature on the basis of the measured hydrostatic pressure change throughout the duration of the test. This theoretical tank shell temperature is presented graphically superimposed upon the measured ambient temperature data and manually scaled to align the first nights theoretical tank shell temperature to the region bounded by the measured ambient temperature and the manually measured fluid temperature for the same time period.

Through direct visual interpretation the operator can identify whether or not the theoretical tank shell temperature is consistent with the measured ambient and fluid temperature for all data throughout the duration of the test and similarly verify the appropriateness of the operator selected fluid and ambient temperature ratio. More specifically if the theoretical tank shell temperature calculated on the basis of the measured head change does not fall within the region banded by the ambient and fluid temperature on subsequent nights the excursion is of interest and observed for linearity.

The operator can apply a simulated leak rate to verify the linearity of the excursion and to confirm the leak rate measured through linear regression of the hydrostatic pressure data. This method allows the operator to correlate changes in measured head with changes in ambient and fluid temperature and if the correlation is strong, validate the measured head data.

Where the correlation is not strong and the excursion from night to night is not linear the change in head can be attributed to other outside influences and thereby the use of irrelevant data avoided (these could include effects such as rain, the bubbler settling in tank sediment, tank pumping operations, etc).

It is believed that, while safe and efficient, the present system and method of its use will obviate significant inconvenience and provide substantial utility to those who wish to detect leaks in storage tanks. Specifically, the present device will allow very small leaks to be detected in very large storage tanks in a consistent and cost-effective manner.

Although the invention has been described with reference to specific embodiments, this description is not meant to be construed in a limited sense. Various modifications of the disclosed embodiments, as well as alternative embodiments of the inventions will become apparent to a person skilled in the art upon the reference to the description of the invention. It is therefore contemplated that the appended claims will cover such modifications that fall within the scope of the invention.

We claim:

1. A system for detecting and quantifying changes in the mass content of liquid storage containers comprising:

differential pressure sensor means configured for receiving input representative of a first and second pressure parameter and for transmitting data representative of differential between said first and second pressure parameters to a computing means;

high pressure measurement means configured for measuring a first pressure parameter in a liquid medium residing within a container, and engaged with said differential pressure sensor means for facilitating the sensing of said first pressure parameter by said differential pressure sensor means;

low pressure measurement means configured, when positioned substantially at the surface of said liquid medium, for measuring said second pressure parameter at said surface of said liquid medium and for facilitating the sensing of said second pressure parameter by said differential pressure sensor means; and ambient temperature measurement means for measuring ambient temperature near said container and reporting data indicative of said ambient temperature to said computing means;

wherein said computing means is configured for recording in a time continuum basis data from said differential pressure sensor means, said high pressure measurement means, said low pressure measurement means, and said ambient temperature measurement means, and for deriving data indicative of changes over time of the mass of said liquid medium within said container.

2. The system of claim 1 further comprising barometric pressure measuring means configured for measuring atmospheric pressure near said container and reporting data indicative of said atmospheric pressure to said computing means, and wherein said computing means is further configured for deriving said data indicative of changes over time of the mass of said liquid medium within said container, basing such derivation, in part, on said date indicative of said atmospheric pressure.

3. The system of claim 2 wherein said high pressure measurement means is a bubbler pressure measurement means.

4. The system of claim 3 wherein said bubbler is in sealed fluid communication with a source of substantially constant pressure, inert gas.

5. The system of claim 3 further comprising temperature management means configured for maintaining the temperature of said differential pressure sensor means at a substantially constant level.

6. The system of claim 2 further comprising temperature management means configured for maintaining the temperature of said differential pressure sensor means at a substantially constant level.

7. The system of claim 1 wherein said high pressure measurement means is a bubbler pressure measurement means.

8. The system of claim 7 wherein said bubbler is in sealed fluid communication with a source of substantially constant pressure, inert gas.

9. The system of claim 7 further comprising temperature management means configured for maintaining the temperature of said differential pressure sensor means at a substantially constant level.

10. The system of claim 1 further comprising temperature management means configured for maintaining the temperature of said differential pressure sensor means at a substantially constant level.

11. A system for detecting leaks in a liquid storage tank comprising:
differential pressure sensor means having a bubbler-based low pressure measurement component and a high pressure measurement component, said high pressure measurement component being configured for measuring tank bottom pressure within a liquid in which a bubbler is immersed, and said low pressure measurement component being configured for receiving data indicative of atmospheric and vapor pressure substantially at the surface of said liquid;

barometric pressure measuring means configured for measuring atmospheric pressure substantially at the surface of said liquid;

barometric pressure and differential pressure calculation means configured for receiving first and second data reflecting, respectively, said tank bottom pressure and of said barometric pressure substantially at said surface of said liquid, and for adjusting said first data to substantially eliminate variations upon said measurements of said tank bottom pressure caused solely from atmospheric pressure variations to yield an atmospheric pressure adjusted tank bottom pressure;

ambient temperature measurement means for measuring ambient temperature near said storage tank;

tank dynamic and barometric pressure adjusted tank bottom pressure calculation means configured for receiving third data indicative of said atmospheric pressure adjusted tank bottom pressure, for receiving fourth data indicative of ambient temperature measurements by said ambient temperature measurement means, for receiving fifth data indicative of expansion characteristics of said storage tank, and for adjusting said third data with reference to said fourth and fifth data to substantially eliminate variations upon measurements and calculations of said barometric pressure adjusted tank bottom pressure, caused solely by dimensional changes in said storage tank resulting from atmospheric temperature variations, to yield a tank dynamic adjusted tank bottom pressure; and tank content mass calculation means for calculating mass contents of said storage tank substantially based on said tank dynamic adjusted tank bottom pressure and operator input data reflecting physical characteristics of said contents of said storage tank.

12. The system of claim 11 further comprising temperature management means configured for maintaining the temperature of said differential pressure sensor means substantially at an operator-specified temperature.

13. A method for detecting leaks in a storage receptacle; comprising the steps of:
selecting a mass detection system comprising:
differential pressure sensor means having a bubbler-based low pressure measurement component and a high pressure measurement component,
said high pressure measurement component being configured for measuring receptacle bottom pressure within a liquid in which a bubbler is immersed,
and said low pressure measurement component being configured for receiving data indicative of atmospheric and vapor pressure substantially at the surface of said liquid;

barometric pressure measuring means configured for measuring atmospheric pressure substantially at the surface of said liquid;

barometric pressure and differential pressure calculation means configured for receiving first and second data reflecting, respectively, said receptacle bottom pressure and of said barometric pressure substantially at said surface of said liquid, and for adjusting said first data to substantially eliminate variations upon said measurements of said receptacle bottom pressure caused solely from atmospheric pressure variations to yield an atmospheric pressure adjusted receptacle bottom pressure;

ambient temperature measurement means for measuring ambient temperature near said storage receptacle;

receptacle dynamic and barometric pressure adjusted receptacle bottom pressure calculation means configured for receiving third data indicative of said atmospheric pressure adjusted receptacle bottom pressure, for receiving fourth data indicative of ambient temperature measurements by said ambient temperature measurement means, for receiving fifth data indicative of expansion characteristics of said storage receptacle, and for adjusting said third data with reference to said fourth and fifth data to substantially eliminate variations upon measurements and calculations of said barometric pressure adjusted receptacle bottom pressure, caused solely by dimensional changes in said storage receptacle resulting from atmospheric temperature variations, to yield a receptacle dynamic adjusted receptacle bottom pressure; and receptacle content mass calculation means for calculating mass content data representative of the contents of said storage receptacle substantially based on said receptacle dynamic adjusted receptacle bottom pressure and operator input data reflecting physical characteristics of said contents of said storage receptacle;

selecting data storage means for collecting a plurality of mass content data as generated by said receptacle content mass calculation means over a plurality of points in time;

selecting computing means configured for generating a human perceptible indication of changes in said mass content data between a plurality of said points in time;

actuating said mass detection system; and recording data indicative of changes in said mass content data attributable to leakage of said storage receptacle to detect such leakage.

14. The method of claim 13 further comprising the steps of:

securing all input and outflow orifices of said storage receptacle before said actuation of said mass detection system; and substantially selectively processing said mass content data which were generated approximately between sunset and sunrise at an installation site of said system.

\* \* \* \* \*